Aug. 25, 1964     O. C. KINDORF     3,145,962
PIPE STRAP
Filed Sept. 17, 1962
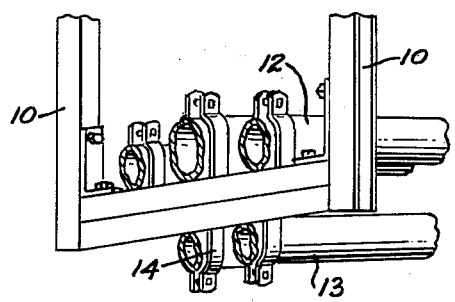
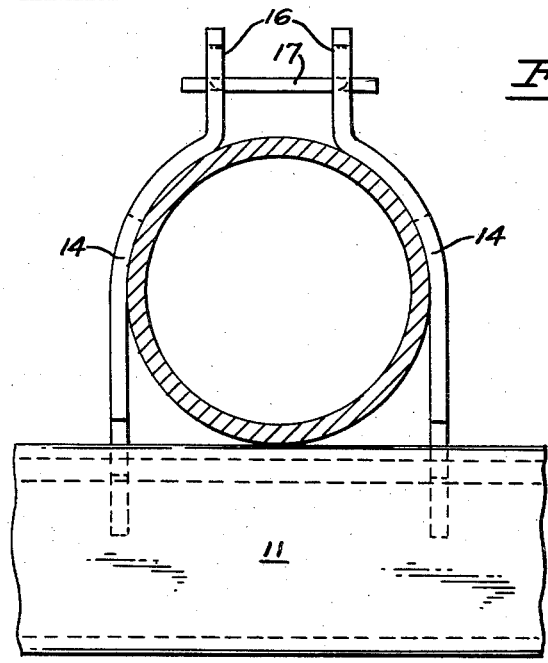
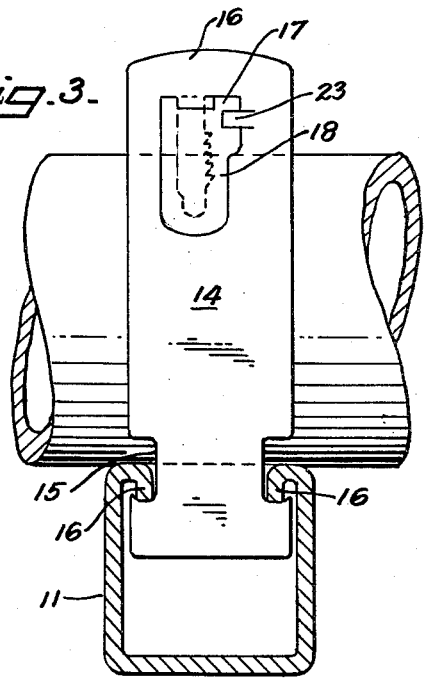
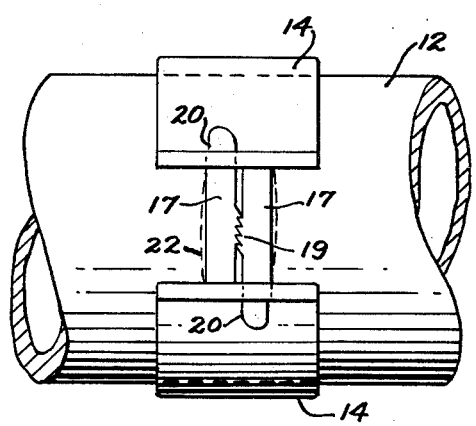
INVENTOR.
ORLAN C. KINDORF
BY
Fryer & Tjensvold
ATTORNEYS

United States Patent Office 3,145,962
Patented Aug. 25, 1964

3,145,962
PIPE STRAP
Orlan C. Kindorf, 500 Mountain Ave., Piedmont, Calif.
Filed Sept. 17, 1962, Ser. No. 223,931
4 Claims. (Cl. 248—68)

This invention relates to pipe straps and particularly to improvements in a kind of pipe strap commonly used for securing pipes, conduits or cables to channel-shaped supporting members.

One known type of pipe strap in common use comprises two strap elements with means adjacent one end to form an interlocking connection with flanges on the edges of a channel-shaped supporting bracket. The opposite edges of the strap elements are curved to embrace the pipe and perforated for a nut and bolt employed to bring them into firm gripping contact with the pipe. The nut and bolt are costly, time consuming to install and are often awkward to manipulate because of space limitations.

It is an object of the present invention to provide a pipe strap of two strap elements having integrally formed interconnecting securing means obviating the necessity of a nut and bolt.

A further object is to provide a pipe strap capable of simple and quick installation and incapable of being released by vibration.

Further and more specific objects and advantages of the invention and the manner in which it is carried into practice are made apparent in the following specification by reference to the accompanying drawing wherein a preferred embodiment of the invention is illustrated.

In the drawing:

FIG. 1 is a perspective view of a conventional pipe hanger with several pipes secured thereto as by pipe straps embodying the present invention;

FIG. 2 is an enlarged end elevation of the pipe strap of the present invention showing it in its position of use with a channel-shaped bracket and pipe;

FIG. 3 is a side elevation of the pipe strap shown in FIG. 2; and

FIG. 4 is a plan view of the same.

A typical and well known type of pipe supporting bracket is shown in FIG. 1 as comprising channel-shaped elements depending from a ceiling or other overhead structure not shown. These depending elements shown at 10 may support pipes by themselves or may support horizontal channel-shaped brackets 11 shown as disposed in back-to-back position so that pipes 12 may be supported on top of them while other pipes 13 may be supported beneath them.

The pipe straps which secure pipes to the channel-shaped brackets 11 are best shown in FIGS. 2 and 3 as comprising two identical strap elements 14 notched at one end as indicated at 15 in FIG. 3 to form an interlocking connection with flanges 16 of the channel 11, this construction being conventional. The strap elements 14 extend upwardly or downwardly as the case may be and are curved adjacent their opposite ends to embrace the pipe to be supported and in conventional practice the ends of these straps are straightened as indicated at 16 to provide tabs which are perforated and through which a nut and bolt extends to draw the strap elements into close contact with the pipe and secure it tightly in place against the channel-shaped bracket 11.

In accordance with the present invention, the nut and bolt referred to is eliminated and each of the strap elements 14 is provided with a tang 17, best illustrated in FIG. 4, and formed by punching an opening shown at 18 in FIG. 3 which surrounds the tang 17 somewhat as shown in dotted lines in FIG. 3. This is accomplished before the curve is formed in the strap element where it embraces the pipe and after the opening has been punched out, the tang 17 is bent from the plane of the opening to the position shown in FIG. 2 at right angles to the tab 16. The width of the opening 18 adjacent its upper end is just sufficient to receive the end of one of the tangs 17 of one strap element alongside the tang of a complementary strap element. The tangs 17 have interengaging ratchet teeth formed on their opposed edges as indicated at 19 in FIG. 4 and the ends of the tangs are slightly reduced in width as shown at 20 to enable them to be freely inserted into the openings 18 prior to interengagement of the ratchet teeth 19.

To assemble the pipe strap, the two strap elements are arranged on opposite sides of the pipe and suitably interlocked with the channel-shaped bracket. They are then brought toward each other until the ends of the tangs 17 project through the openings 18 and the tabs 16 of the strap elements are then forceably urged toward each other with any suitable tool such as heavy duty pliers. This causes the tangs 17 to bow or spread slightly as indicated by dotted lines 22 in FIG. 4 enabling the teeth 19 of the two tangs to ride over each other and then to become resiliently returned and tightly interlocked.

It is possible to disengage the two strap elements by inserting a narrow tool such as a screwdriver or chisel between the tangs 17 and exerting a twisting force thereon. Since considerable force is required to effect engagement in this manner, the opening 18 is provided with a tab 23 (see FIG. 3) which underlies the tangs 17 of the opposite element.

This tab is extended by cutting back into the margin of the opening and can be bent at right angles to free the tang 17 which it underlies for downward bending movement to separate the interengaged teeth 19 and permit separation of the strap elements.

The pipe strap of the present invention is economical because of the fact that it makes unnecessary the previously used nut and bolt which are parts likely to be dropped during assembly with consequent loss of time. It is also economical because the two strap elements are of identical configuration and capable of being completely formed by simple punch press operations.

I claim:

1. A pipe strap comprising a pair of strap elements adapted for connection to a support bracket at one end, said elements being curved adjacent their opposite ends to embrace a pipe between them, and interconnecting means at said opposite ends including a toothed tang projecting from an edge of an opening in each strap element into the corresponding opening in the other strap element to confine them to positions where their teeth are in interlocking engagement.

2. The pipe strap of claim 1 in which the tangs are resilient to permit their teeth to override each other as the ends of the strap elements are urged toward each other.

3. The pipe strap of claim 2 in which the ends of the tangs are of reduced size to facilitate their insertion into the confining openings.

4. The pipe strap of claim 1 in which at least one of the confining openings has a tab projecting from one edge and underlying a tang, said tab being bendable away from the tang to permit it to be moved out of the plane of and disengaged from the other tang.

References Cited in the file of this patent

UNITED STATES PATENTS

| 2,375,513 | Bach | May 8, 1945 |
| 2,632,217 | Flora | Mar. 24, 1953 |
| 2,915,268 | Wrobel | Dec. 1, 1959 |
| 2,918,240 | Wiegand | Dec. 22, 1959 |
| 2,931,607 | McFarland | Apr. 5, 1960 |

FOREIGN PATENTS

| 524,708 | Great Britain | Aug. 13, 1940 |